Patented Nov. 8, 1949

2,487,525

UNITED STATES PATENT OFFICE 2,487,525

DIALKYLIDENE DIETHERS

John W. Copenhaver, Easton, Pa., assignor to General Aniline & Film Corporation, New York, N. Y., a corporation of Delaware No Drawing. Application July 19, 1947, Serial No. 762,213

6 Claims. (Cl. 260—615).

This invention relates to the production of alkylidene diethers containing at least 5 carbon atoms in the alkylidene radical by the reaction of vinyl ethers with acetals, including ketals, in which the parent aldehyde or ketone contains at least 3 carbon atoms in the presence of an anhydrous acid-reacting condensing agent.

Alkylidene diethers and ether esters containing 4 carbon atoms in the alkylidene radical have heretofore been produced by reacting vinyl ethers with acetals of acetaldehyde. In this reaction it was assumed that a hydrogen atom of the methyl group of the alkylidene radical migrated to the methylene group of the vinyl ether, the reaction (as described in U. S. Patent No. 2,165,962 to Mueller-Cunradi and Pieroh) being formulated in the following manner:

Equation I

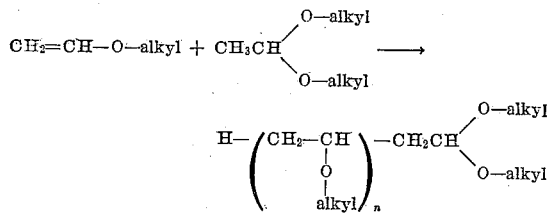

It has now been found that instead of a hydrogen atom migrating as previously supposed, the reaction involves the migration of one of the alkoxy groups of the acetal, so that by reacting a vinyl ether with an acetal of an aldehyde or ketone containing at least 3 carbon atoms, a novel type of alkylidene diether is produced. For example, when methyl vinyl ether is reacted with dimethyl butyral, a straight chain product (1,1,3-trimethoxy hexane) is obtained instead of the branch chain compound (1,1-dimethoxy-2-α-methoxy-ethyl-butane) as would have been supposed from what was previously known of reactions of this type. That this was the case and that mechanism of the reaction involved a migration of an alkoxy group could not be determined with the type of reactants heretofore employed in this reaction, in which the alkoxy groups were all the same, since when this is the case and a vinyl ether and the corresponding acetal of acetaldehyde are reacted, the same alkylidene diether would be produced regardless of the mechanism of the reaction.

The course of the reaction involved in the production of the novel type alkylidene diethers and the type of reactants which may be employed in the reaction and the type of novel alkylidene diethers obained are illustrated in the following equation:

Equation II

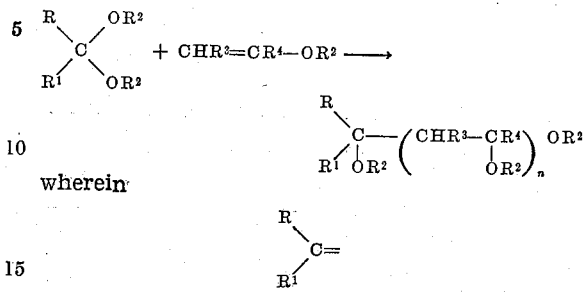

wherein is a bivalent hydrocarbon radical of at least 3 carbon atoms in which R is hydrocarbon and $R^1$ is hydrogen or hydrocarbon, $n$ is an integer and $R^2$ is a radical of an alcohol, preferably of a lower aliphatic alcohol, and $R^3$ and $R^4$ are hydrogen or hydrocarbon.

The process employed for producing these novel type alkylidene diethers may advantageously be that employed for the reaction of vinyl ethers with acetals of acetaldehyde; that is, the acetal of an aldehyde or ketone containing at least 3 carbon atoms, is reacted with a vinyl ether in the presence of an anhydrous acid-reacting condensing agent, particularly boron trifluoride or its diethyl ether complex, although other acid-reacting condensing agents such as boron trichloride, stannic chloride, titanic chloride, sulfuric acid and the like may be used, if desired. Only minor amounts of catalyst are required and when employing boron trifluoride or its diethyl ether complex, amounts varying from 0.0001 to 0.1 mol per mol of acetal have been found to be effective, the preferred amount of catalyst having been found to be within the range of 0.0025 to 0.01 mol per mol of acetal. The reaction may be carried out at temperatures varying from 0–100° C. and preferably within the range of 0–50° C., using superatmospheric pressure, if necessary, in order to keep any of the reactants in liquid phase. The nature of the products obtained (i. e. the chain length of alkylidene residue of the product) depends on the relative proportions of acetal and vinyl ether. Thus, 1,1,3-trimethoxy hexane is obtained in about 90% yield, based on the amount of methyl vinyl ether employed, when methyl vinyl ether and dimethyl acetal of butyraldehyde are mixed in molar proportions of about 1:3. Thus, when the amount of vinyl ether in the reaction mixture is increased, the resultant product becomes a mixture of alkylidene compounds of higher molecular weight (i. e. in which $n$ in Equation II is more than 1).

The details of the present invention are fully illustrated in the following examples:

Examples 1

Seven hundred and twenty parts diethyl butyral and 0.315 part boron fluoride etherate were mixed in a glass reactor fitted with a thermometer, warmed to 45° C. and 93 parts methyl vinyl ether passed into the stirred solution over 2.25 hours while maintaining the temperature of the reaction at 45–50° C. After standing overnight, the boron fluoride catalyst was neutralized with 1 part ethanolamine and distilled. After removing the unreacted diethyl butyral, the major reaction product boiled at 98° C./11 mm. Yield: 204 parts (63.5% of the theory) $N_D^{25}$ 1.4176; $d_4^{25}$ 0.8698. Analysis: Calc. for $C_{11}H_{24}O_3$; C, 64.66; H, 11.84. Found: C, 64.70; H, 12.12. The reaction product is (1,3-diethoxy, 1-methoxy hexane).

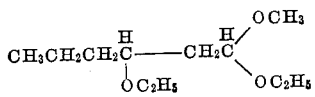

Higher boiling polyalkoxy acetals are also formed.

Example 2

Two hundred and fifty-eight parts (1.5 mols) cyclohexanone diethyl ketal and 0.1 part boron fluoride etherate were mixed with stirring and 49 parts (0.85 mol) methyl vinyl ether passed in with stirring over 1.5 hours. The reaction was exothermic and the temperature of the reaction mixture was maintained at approximately 35° C. by cooling. The catalyst was neutralized with 0.5 ml. ethanolamine and distilled. After removing the unreacted cyclohexanone ketal, 1-ethoxy, 1-(β-ethoxy, β-methoxy ethyl) cyclohexane was obtained as a clear white liquid, B. P. 79–81/2 mm., having index of refraction $N_D^{25}$ 1.4448 and density $d_4^{25}$ 0.9522. Analysis: Calc. for $C_{13}H_{26}O_3$, C, 67.79; H, 11.38. Found: C, 68.29; H, 11.29. Higher boiling polyalkoxy acetals were also present in the reaction mixture.

Example 3

Six hundred and eight parts (4 mols) dimethyl benzal and 0.25 part boron fluoride etherate were mixed and 130 parts (2.25 mols) methyl vinyl ether bubbled into the reaction mixture over 2.25 hours. The temperature of the reaction mixture was maintained at 30–40° C. by intermittent cooling. After stirring one hour, the catalyst was neutralized with 1 part ethanolamine and the reaction mixture distilled. The major reaction product 1,1,3-trimethoxy, 3-phenyl propane boiling at 112° C./6 mm. was obtained in 56% yield based on vinyl ether. It had the following physical constants: $N_D^{25}$ 1.4830, $d_4^{25}$ 1.0132.

Example 4

Forty parts (0.3 mol) diethyl ketal and 0.2 part boron fluoride were mixed and 9 parts (0.15 mol) methyl vinyl ether passed in. The reaction was slightly exothermal and the temperature was held below 4° C. by external cooling. After stirring 0.5 hour, the catalyst was neutralized with sodium methylate and the reaction product distilled. After removing the unreacted ketal, there was obtained a 32% yield of β-methyl-β-ethoxy butyraldehyde methyl ethyl acetal boiling at 111° C./6 mm., $N_D^{25}$ 1.4245. Analysis: Calc. for $C_{10}H_{22}O_3$; C, 63.11; H, 11.65. Found: C, 63.20; H, 11.20.

It will be understood that the foregoing examples are illustrative only of preferred embodiments of the present invention and that various modifications will suggest themselves to those skilled in the art.

It will be apparent that a wide variety of novel alkylidene diethers of the type embodied in this invention may be prepared by selection of the specific acetal and specific vinyl ether which are employed as reactants. Examples of other acetals of oxocarbonylic compounds which may be employed in place of the diethyl butylral, cyclohexanone diethyl acetal, dimethyl benzal or diethyl ketal employed in the foregoing examples are dimethyl propional, dimethyl isobutyral, dimethyl acetal of lauraldehyde, dimethyl acetal of stearaldehyde, cyclohexanone dimethyl acetal, acetone dimethyl acetal, methyl ethyl ketone dimethyl acetal, phenyl acetaldehyde dimethyl acetal, acetophenone dimethyl acetal and the like, or the corresponding diethyl, propyl, dipropyl, dibutyl or other di-alkyl or mixed alkyl, for instance, methyl ethyl acetals and the like. Likewise, vinyl ethers of the general formula:

$$CHR^1=CR^2-O-R$$

wherein R is hydrocarbon, preferably lower alkyl and $R^1$ and $R^2$ are preferably hydrogen but may be hydrocarbon, are operative in the process. Examples of specific α, β-ethylenically unsaturated ethers which may be employed include the methyl-, ethyl-, propyl-, isopropyl-, n-butyl-, isobutyl-, dodecyl-, octadecyl-, phenyl-, cresyl- and benzyl ethers of such α, β-ethylenically unsaturated alcohols as vinyl-, isopropenyl-, butenyl-, α-phenyl vinyl- and β-phenyl vinyl alcohol. Likewise, vinyl ethers such as β-methoxyethyl vinyl ether and β-methyl thioethyl vinyl may be used, if desired. It will be understood that the product obtained will correspond to the specific reactants employed in the reaction as indicated in Equation II above.

I claim:

1. Alkylidene diethers of the formula:

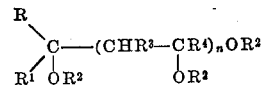

wherein

is a hydrocarbon radical of at least 3 carbon atoms which R is hydrocarbon and $R^1$ is a member of the group consisting of hydrogen and a hydrocarbon radical, and R and $R^1$ together may form a carbocyclic ring, and $n$ is an integer, the $R^2$'s are radicals of an alcohol and $R^3$ and $R^4$ are members of the group consisting of hydrogen and hydrocarbon radicals.

2. Alkylidene diethers of the formula:

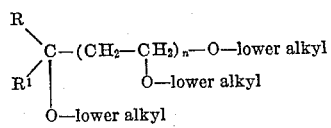

wherein

is a hydrocarbon radical of at least 3 carbon atoms in which R is hydrocarbon and $R^1$ is a member of the group consisting of hydrogen and a hydrocarbon radical, and R and $R^1$ together may form a carbocyclic ring, and $n$ is an integer.

3. 1,1,3-trialkoxy alkanes containing at least 5 alkane carbon atoms.

4. 1,1,3-trialkoxy hexanes.

5. 1,3-diethoxy-1-methoxy-hexane.

6. β-methyl, β-ethoxy butyraldehyde methyl ethyl acetal.

JOHN W. COPENHAVER.

REFERENCES CITED

The following references are of record in the file of this patent:

UNITED STATES PATENTS

| Number | Name | Date |
|---|---|---|
| 2,165,962 | Cunradi et al. | July 11, 1939 |
| 2,196,744 | Dickey et al. | Apr. 9, 1940 |